Feb. 26, 1946.  J. HOJNOWSKI  2,395,547
BOMBER AIRPLANE
Filed July 17, 1942  2 Sheets-Sheet 1
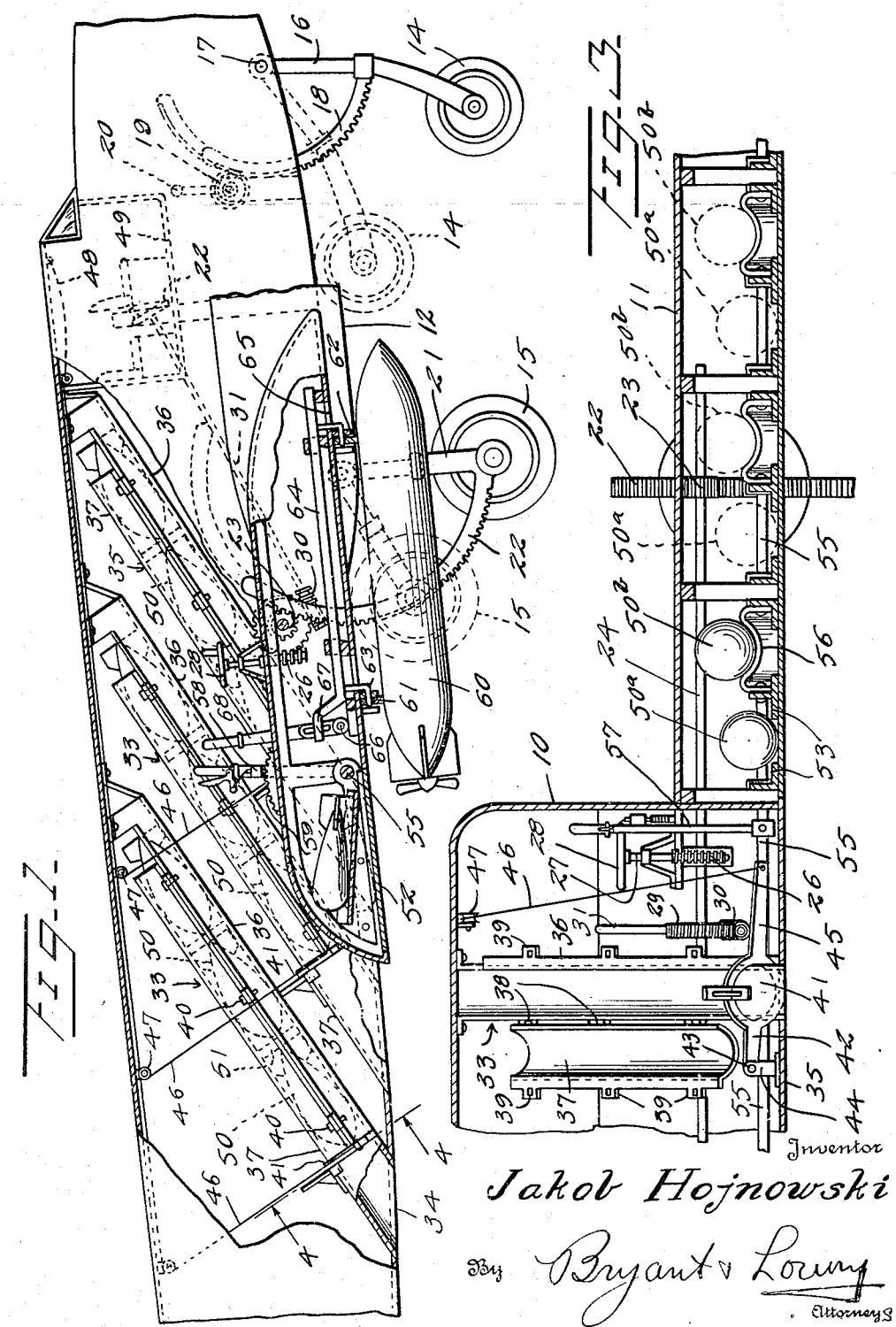
Inventor
Jakob Hojnowski
By Bryant & Loring
Attorneys

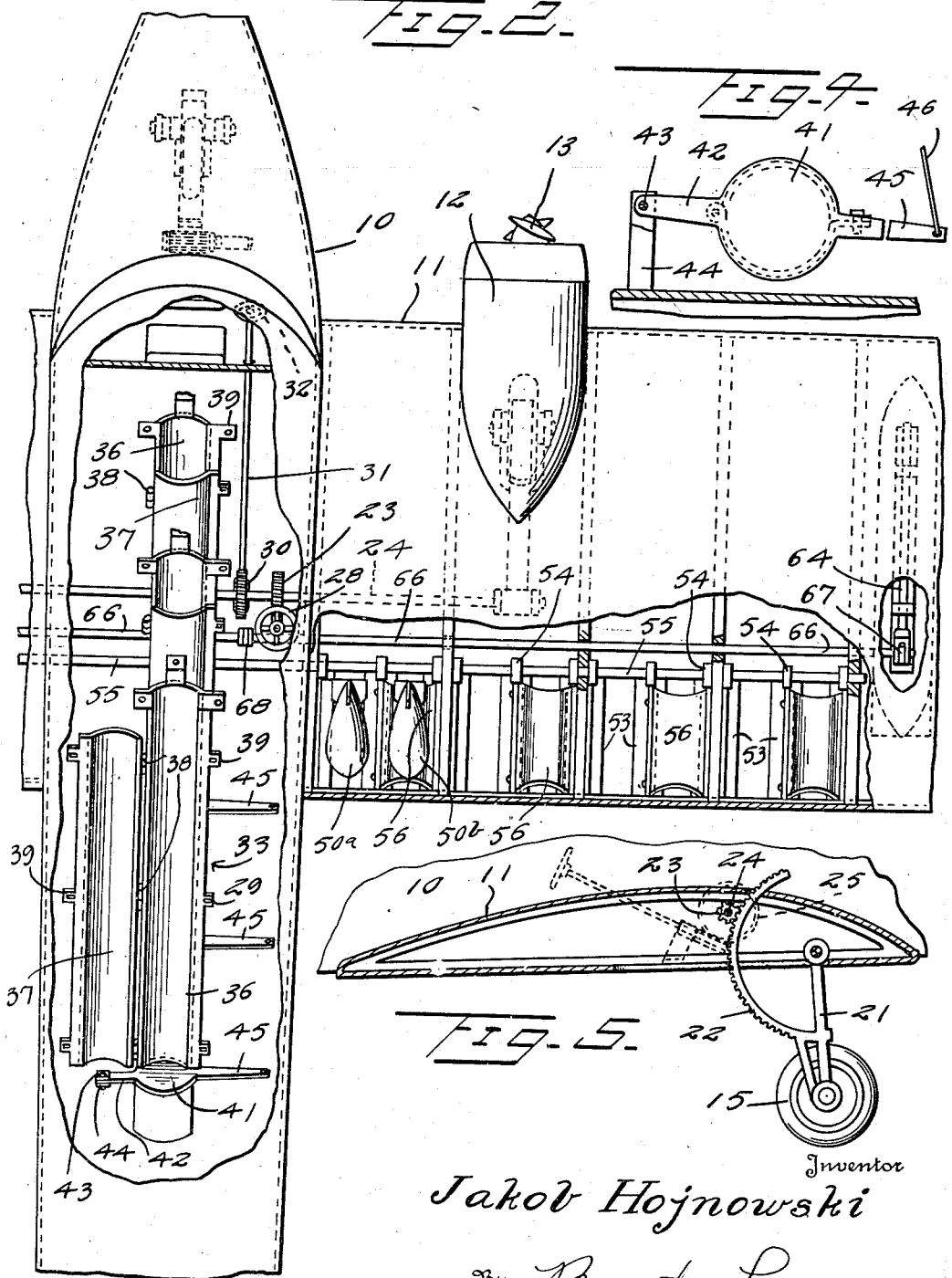

Patented Feb. 26, 1946

2,395,547

UNITED STATES PATENT OFFICE 2,395,547

BOMBER AIRPLANE

Jakob Hojnowski, Nekoosa, Wis.

Application July 17, 1942, Serial No. 451,337

1 Claim. (Cl. 89—1.5)

This invention relates to certain new and useful improvements in bomber airplanes.

The object of the invention is to provide a bomber airplane wherein the fuselage and side wings of the plane are utilized as carriers for bombs, the discharge of which is controlled by the pilot or other operator from within the cockpit of the airplane.

A further object of the invention is to provide a bomber airplane with the fuselage and side wings constructed for carrying bombs and having control devices for the discharge thereof, provision being also made for the suspension of a torpedo from beneath each side wing with discharge means therefor operated within the fuselage.

It is a still further object of the invention to provide retractible landing gear for the bomber airplane with such landing gear associated with the forward end of the fuselage and lateral wings.

With the above and other objects in view that will become apparent as the nature of the invention is better understood, the same consists in the novel form, combination and arrangement of parts hereinafter more fully described, shown in the accompanying drawings and claimed.

In the drawings:

Figure 1 is a fragmentary vertical longitudinal sectional view of a bomber airplane constructed in accordance with the present invention, showing gate controlled chutes within the fuselage for the housing of bombs and the supports in the side wings for bombs.

Figure 2 is a fragmentary top plan view, partly broken away and shown in section, with the cover section of one of the guide chutes for housing bombs in open position, Figure 3 is a fragmentary vertical cross-sectional view showing inclined cradle supports for bombs in the wing staggered with respect to bombs supported on the bottom of the wing, Figure 4 is a detail sectional view taken on line 4—4 of Figure 1, showing a control gate at the discharge end of one of the bomb chutes in the fuselage, and Figure 5 is a detail cross-sectional view through the wing and illustrating a part of the retractible landing gear associated therewith.

Referring more in detail to the accompanying drawings, the bomber airplane comprises a fuselage 10 carrying side wings 11 and as illustrated each wing supports a motor 12 carrying a screw propeller 13.

The landing gear for the bomber airplane comprises retractible wheels, one of such wheels 14 being associated with the nose end of the fuselage, while a wheel 15 is associated with each side wing 11. The wheel 14 is carried by a leg 16 pivoted as at 17 within the nose end of the fuselage and said leg 16 carries a rearwardly directed arcuate toothed segment 18 extending upwardly into the fuselage as shown in Figure 1 for engagement with a pinion 19 operated by a crank handle 20. The landing gear wheels 15 associated with the wings 11 each carry a supporting leg 21 from which there rearwardly extends an arcuate toothed segment 22 extending upwardly through the wing 11 for engagement with a pinion 23 fixed to a shaft 24. The shaft 24 being suitably supported extends through the fuselage and both wings 11 and within the fuselage has fixed thereto a worm wheel 25 that is engaged by the worm 26 upon the vertically journaled shaft 27 that is operated by the hand wheel 28. The shaft 24 for the operation of the landing gear wheels 15 may also be operated from the driver's seat or cockpit of the airplane by means of a second worm wheel 29 fixed to the shaft 24 engaged by the worm 30 carried by the rear end of the shaft 31 that extends forwardly into the cockpit of the airplane with the hand wheel 32 thereon for operation thereof.

The fuselage 10 of the airplane is equipped with a series of inclined bomb carrying chutes designated in general by the reference character 33 that have the open lower ends thereof 34 extending through the bottom wall 35 of the fuselage. Each bomb carrying chute 33 is of cylindrical construction and comprises a rigid lower half section 36 and an upper half section 37 hinged thereto as at 38 along one side edge so that the upper half or cover section 37 may be swung to an open position for the placement of bombs within the fixed lower section of the chute. The free edges of the bottom and cover sections 36 and 37 of the bomb carrying chutes are provided with cooperating apertured lugs 39 for the reception of locking pins 40 to hold the cover section of the bomb chute in closed position.

Each bomb chute 33 adjacent its lower open end has a cross slot therein that is normally closed by a gate plate 41 that carries an outwardly directed arm 42 at one side for pivotal mounting at its outer end as at 43 upon an upright 44, the diametrically opposite side of the gate plate 41 carrying a lever arm 45 to the free end of which one end of a cable 46 is attached, with the cable traversing pulleys 47 on the ceiling of the fuselage with the operating pull ends 48 thereof terminating within the cockpit 49 in the fuselage. A series of bombs 50 is mounted in each chute and these are preferably separated by spacer blocks 51 as shown in Figure 1.

It will be understood that upon operation of any one of the cables 46 associated with the gate plate 41 of a bomb chute 33 for displacing the gate plate laterally of the bomb chute, the bombs 50 will be gravitationally discharged through the lower open end 34 of the chute and under control of the pilot or operator.

Each wing 11 of the airplane is equipped at the trailing edge thereof with devices for the support and controlled discharge of bombs, the bottom wall of the trailing edge of each wing comprising a hinged door section 52 to the upper surface of which relatively short angle bars 53 are secured in spaced relation with a block 54 at the rear end of each angle iron 53 rigidly secured to a longitudinally extending shaft 55 extending through the fuselage and side wings as illustrated. A series of upwardly and rearwardly inclined bomb supporting cradles 56 are secured to adjacent angle bars 53, these cradles 56 being arranged in spaced relation or staggered with respect to bombs that are directly supported upon the hinged door 52. As shown in Figure 3, the shaft 55 within the fuselage 10 has attached thereto an operating lever 57 that effects downwardly hinging movement of the bottom door sections 52 on the shaft 55, the lever 57 as shown in Figure 1 carrying a tensioned latch pawl 58 cooperating with the rack segment 59. It will be understood that upon limited opening movement of the wing doors 52, the bombs 50a supported on the doors 52 will be first discharged and upon further opening movement of the door 52 the bombs 50b supported upon the cradles 56 will be sequentially discharged.

A torpedo support is carried by each wing 11 and as shown in Figure 1, the torpedo 60 carries spaced apertured lugs 61 normally positioned between spaced apertured lugs 62 depending from the bottom wall of the wing forwardly of the hinged door 52 with angle pins 63 positionable through said apertured lugs, said pins being carried by a slide rod 64 within the wing and passing through openings 65 in the bottom of the wing. A shaft 66 extends through the fuselage wings adjacent the rear ends of the slide rod 64 in each wing, each end of the shaft 66 carrying a radial arm having a pin and slot connection 67 with the adjacent rear end of the slide rod 64, while operation of the shaft 66 is effected by means of the hand lever 68 fixed to the shaft 66 within the fuselage 10. Upon operation of the shaft 66 by means of the hand lever 68, the slide rods 64 are shifted to displace the hook arms 63 from engagement with the apertured lugs 61 and 62 for the discharge of the torpedo 60.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:

In a bomber airplane, wherein the airplane has a fuselage and side wings, bomb chutes within the fuselage, the bomb chutes being of tubular formation and inclined downwardly and rearwardly from substantially the top of the fuselage to the bottom thereof, each bomb chute being formed of top and bottom sections hinged together on the transverse median line, the top section terminating short of the bottom section at its upper end to facilitate opening of the top section for the loading of bombs in the chute and terminating at its other end adjacent the lower end of the chute, a manually operated hinged flat gate extending across the lower end of the chute at the lower end of the hinged top section for controlling the discharge of bombs from the chute, the gate hinge being located laterally of the chute at one side and an operating arm on the gate diametrically opposite the gate hinge.

JAKOB HOJNOWSKI.